Oct. 27, 1953     A. TROSCH ET AL     2,657,063
CAR WHEEL BORER
Filed Sept. 22, 1950     7 Sheets-Sheet 1
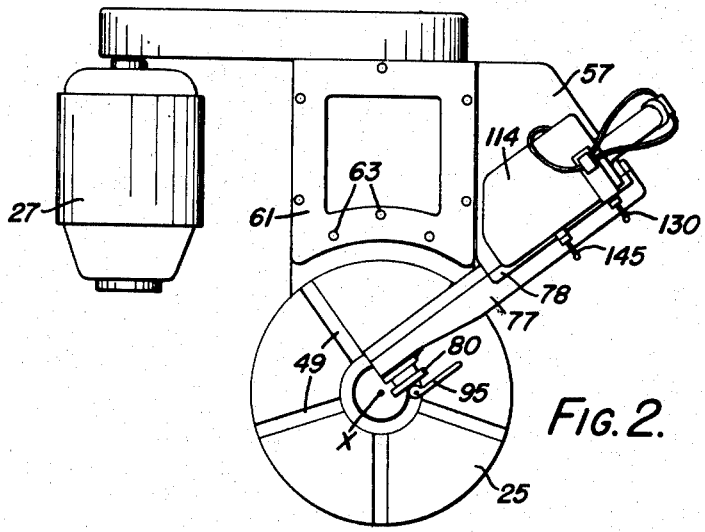
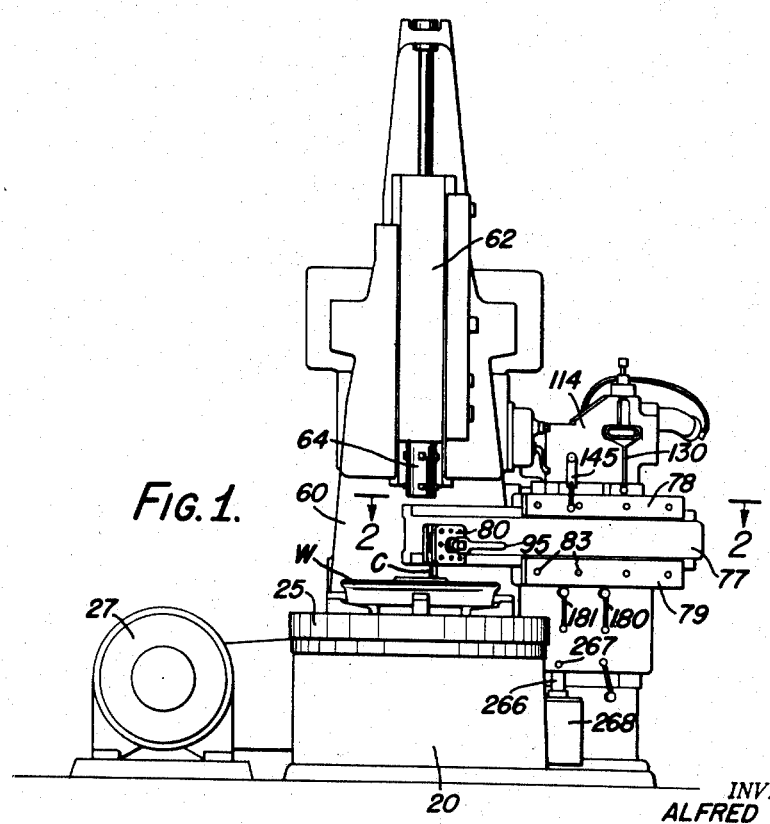
INVENTORS.
ALFRED TROSCH
AND ROLAND R. ROBERTS
BY
ATTORNEY Oct. 27, 1953　　A. TROSCH ET AL　　2,657,063
CAR WHEEL BORER
Filed Sept. 22, 1950　　　　　　　　　　　　　7 Sheets-Sheet 2
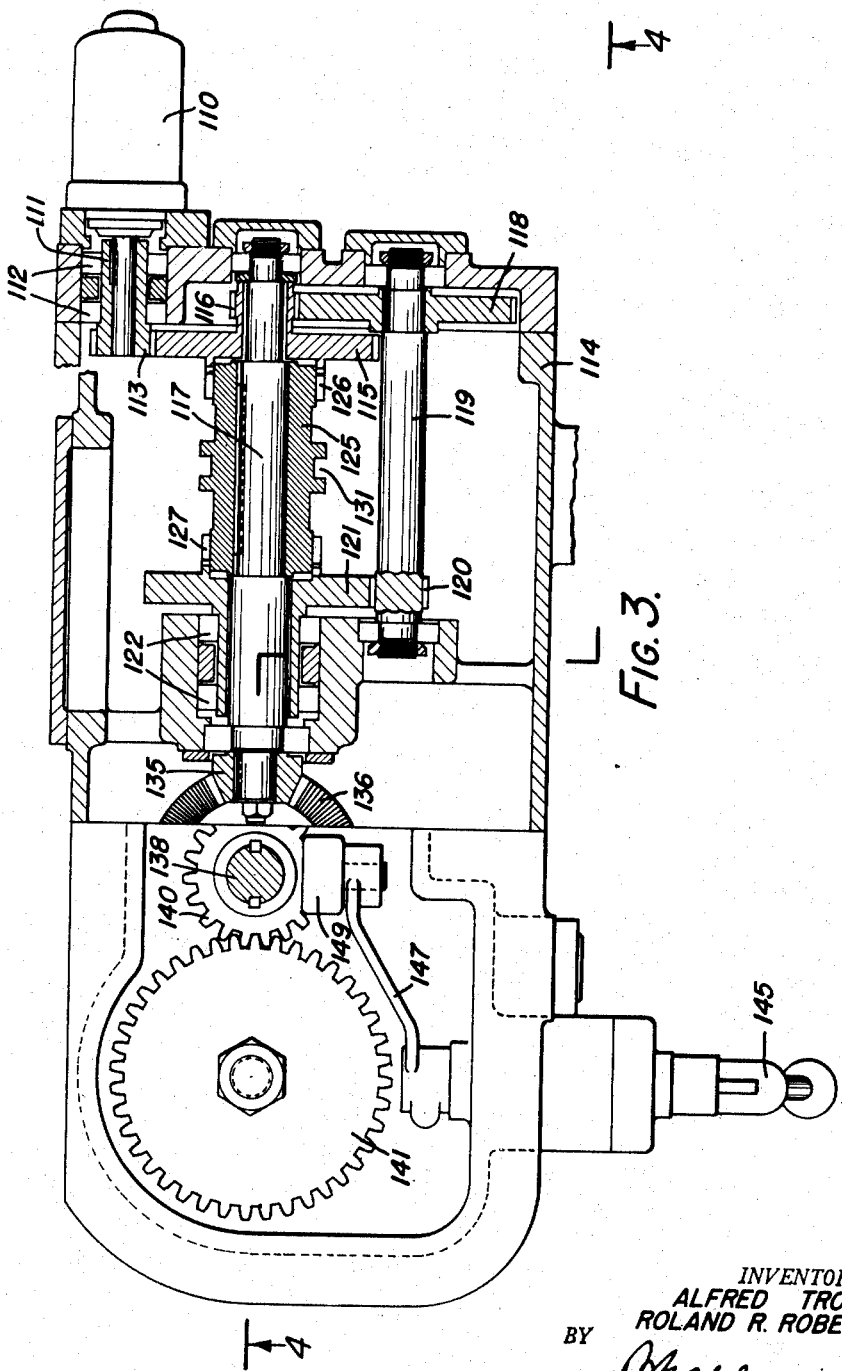
INVENTORS.
ALFRED TROSCH
ROLAND R. ROBERTS
BY
ATTORNEY

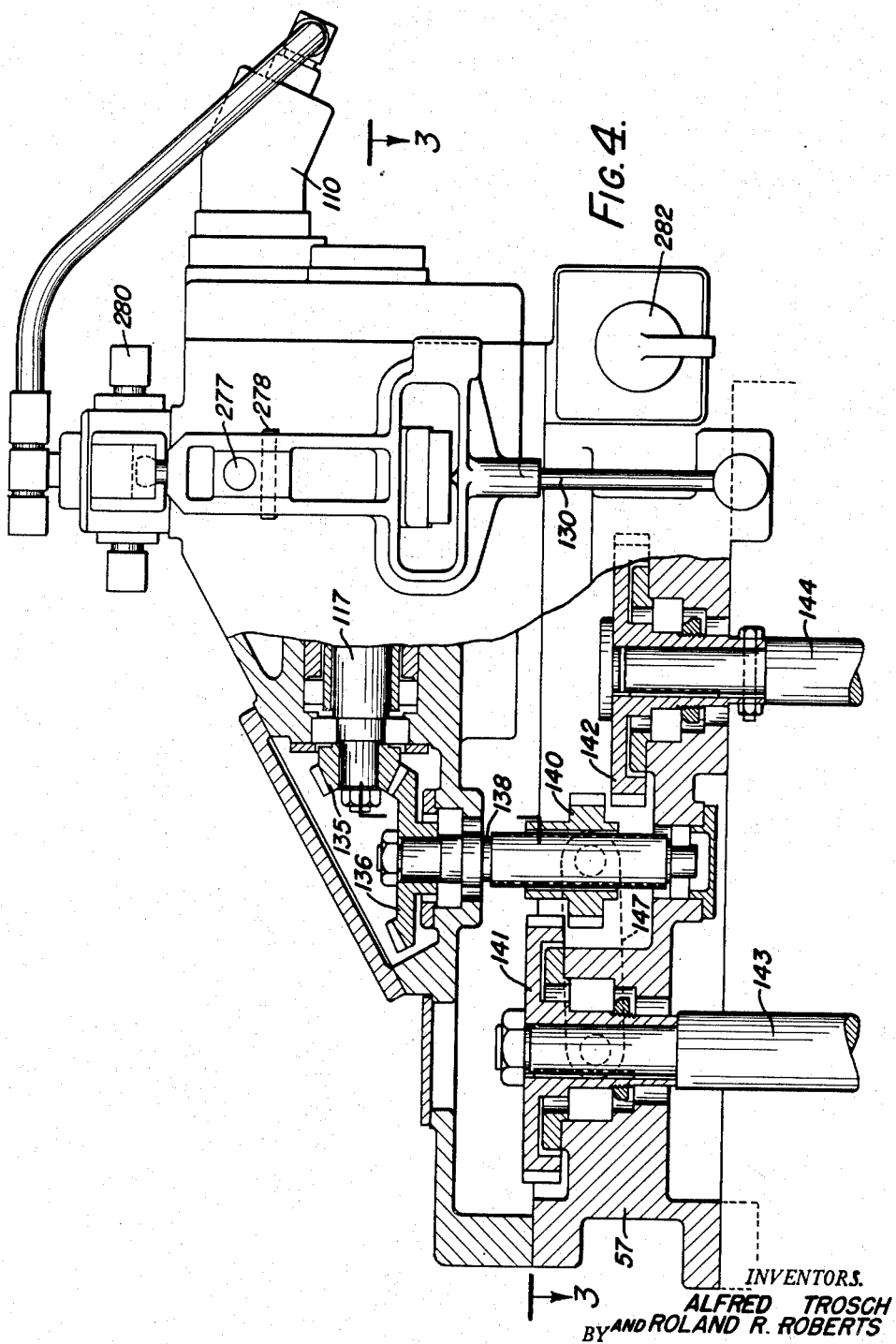

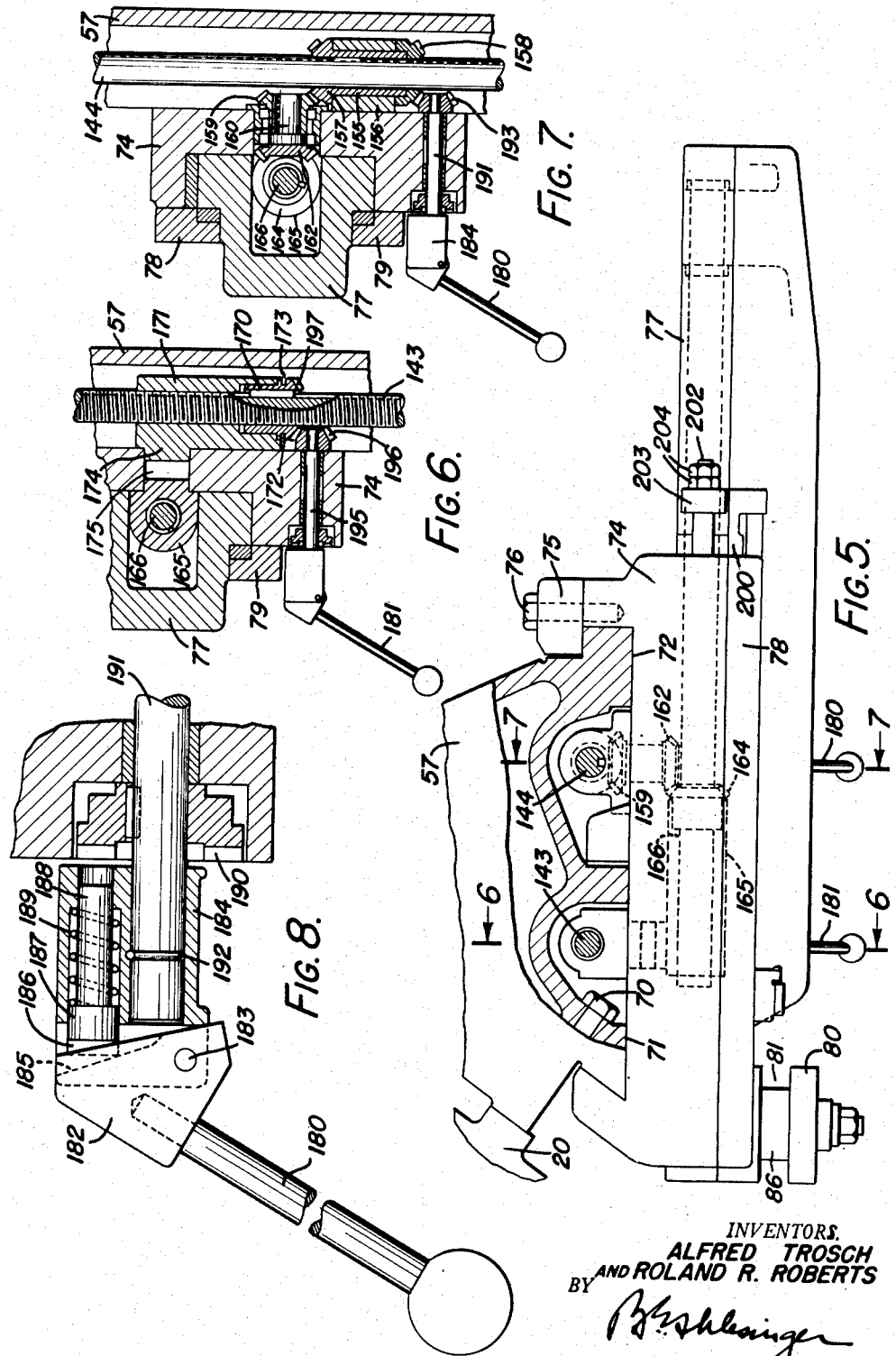

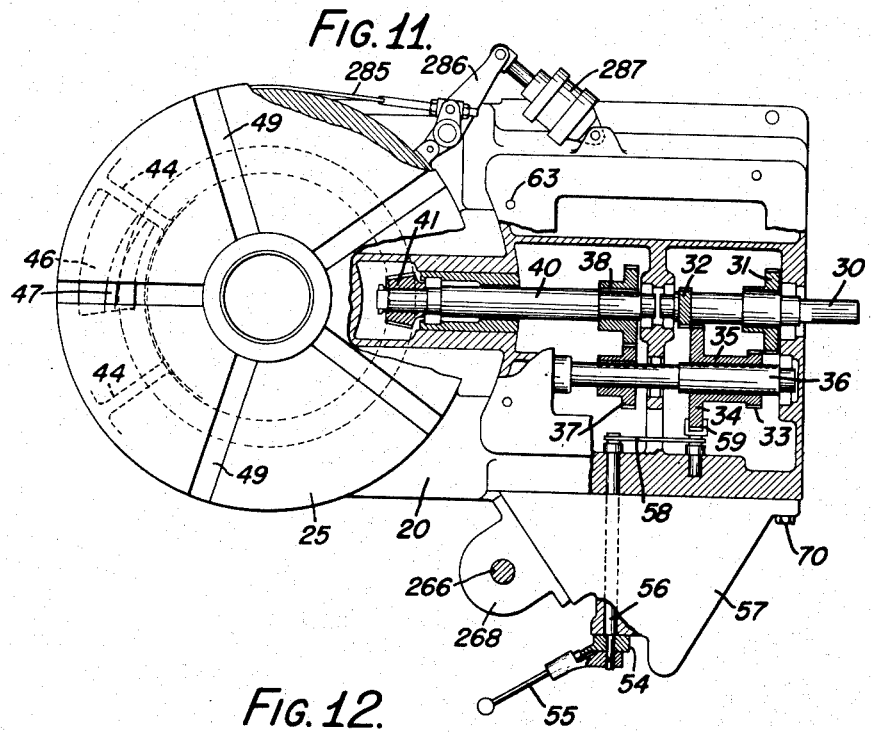
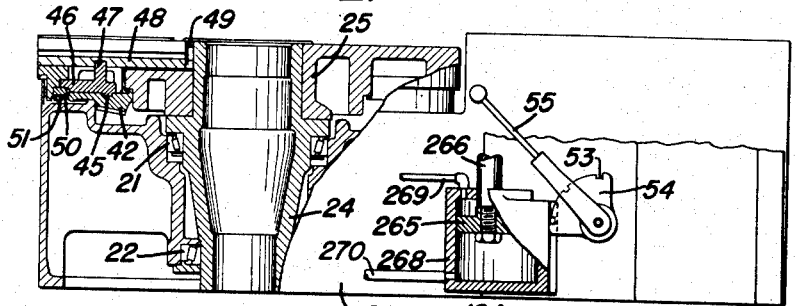
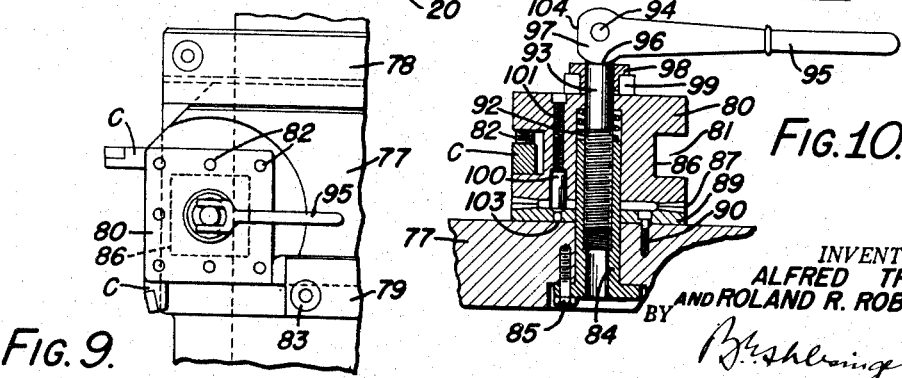

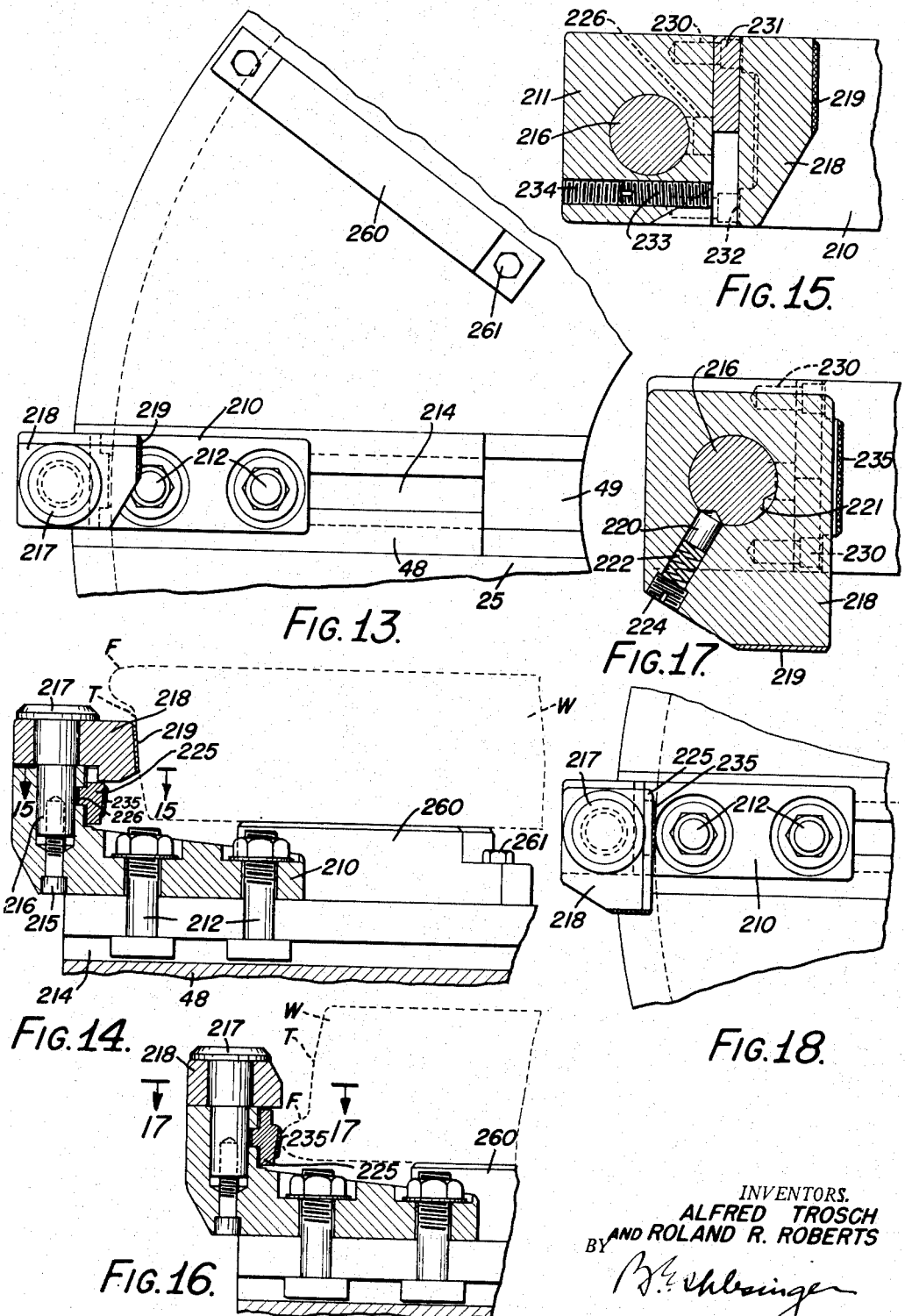

Patented Oct. 27, 1953

2,657,063

UNITED STATES PATENT OFFICE 2,657,063

CAR WHEEL BORER

Alfred Trosch, Brighton, and Roland R. Roberts, Irondequoit, N. Y., assignors to Consolidated Machine Tool Corporation, Rochester, N. Y., a corporation of Delaware Application September 22, 1950, Serial No. 186,225

8 Claims. (Cl. 279—1)

The present invention relates to boring machines and particularly to car wheel borers.

The conventional car wheel borer is designed to rough and finish-bore the wheel, and to chamfer, and face its hub on one side only.

Diesel locomotives are coming more and more extensively into use. It is necessary to face both sides of the hub of a diesel locomotive wheel and to turn the outside diameter of the hub at opposite sides of the web. In some cases, it is necessary, also, to face the tread rim and to true up the outside of the flange.

A primary object of the present invention is to provide a car wheel borer capable of chucking a car wheel either with the flange side up or the flange side down so as to permit facing both sides of the hub and turning the outside diameter of the hub at both sides of the flange.

Another object of the invention is to provide a car wheel borer which will be capable of boring, facing, and turning a car wheel at both sides of the flange without increasing the floor dimensions of the machine.

Another object of the invention is to provide a car wheel borer, which will lend itself to the various operations required for boring, turning, facing and chamfering a wheel for a diesel locomotive and which will be easily manipulable.

Other objects of the invention will be apparent hereinafter from the specification and from the recital of the appended claims.

In the drawings:

Fig. 1 is a front elevation of a car wheel borer built according to one embodiment of this invention;

Fig. 2 is a section on the line 2—2 of Fig. 1 looking in the direction of the arrows;

Fig. 3 is a horizontal section through the side head feed box of this machine, the section being taken on the line 3—3 of Fig. 4 looking in the direction of the arrows;

Fig. 4 is a part vertical section, part elevation of this feed box, taken on the line 4—4 of Fig. 3, looking in the direction of the arrows;

Fig. 5 is a part plan, part sectional view showing the side head of this machine and its mounting;

Fig. 6 is a section on the line 6—6 of Fig. 5;

Fig. 7 is a fragmentary sectional view on the line 7—7 of Fig. 5;

Fig. 8 is a fragmentary sectional view on an enlarged scale showing the manual clutching mechanism for one of the manual controls of the movement of the side head;

Fig. 9 is a fragmentary side elevation of the indexable tool head;

Fig. 10 is a transverse section through this tool head;

Fig. 11 is a part plan, part sectional view of the base of the machine, and the face plate and showing in section the drive to the face plate;

Fig. 12 is a part side elevation, part section showing the base, the face plate, the work spindle, and its mounting;

Fig. 13 is a fragmentary plan view of the base plate showing one of the chucking jaws and one of the work rests mounted thereon;

Fig. 14 is a fragmentary vertical section of the chucking jaw showing diagrammatically how it is used when the car wheel is chucked with the flange side up;

Fig. 15 is a horizontal section on the line 15—15 of Fig. 14, looking in the direction of the arrows;

Fig. 16 is a section similar to Fig. 14 but showing how the chuck is used when the car wheel is chucked flange side down, the upper member of the chucking jaw being swung out of position and the lower member of the jaw being in chucking position;

Fig. 17 is a section showing the chuck member in this position, taken on the line 17—17 of Fig. 16, looking in the direction of the arrows;

Fig. 18 is a plan view of the parts in this position;

Figure 19:
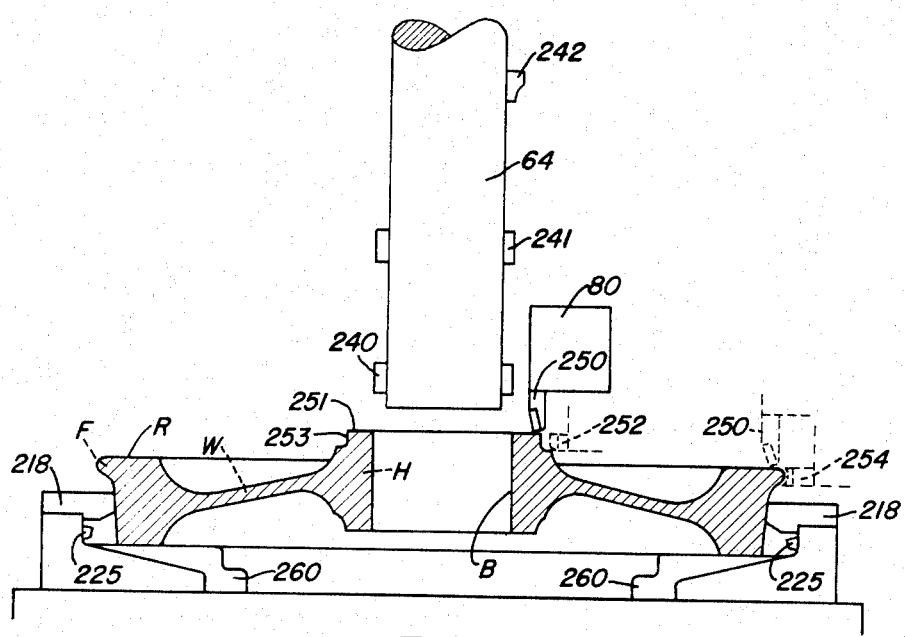
Fig. 19 is a diagrammatic view illustrating the operations which may be performed on the machine when the car wheel is chucked flange side up.

Referring now to the drawings by numerals of reference, 20 denotes the base of the machine. Journaled in the base 20 on anti-friction bearings 21 and 22 (Fig. 12) is the work spindle 24. The face plate 25 of the machine is keyed or otherwise secured to the spindle 24 to rotate therewith. It is driven from a motor 27 (Figs. 1 and 2) which is mounted on the base 20 or along side the machine and which drives through a belt and pulley the shaft 30 (Fig. 11). This shaft has a spur gear 31 and a spur pinion 32 secured to it. These gears are adapted to mesh with a spur gear 33 and a spur gear 34, respectively. The gears 33 and 34 are formed integral with a sleeve 35 that has sliding splined engagement with a shaft 36 which is journaled on anti-friction bearings in the base 20. Keyed to the shaft 36 is a spur gear 37 which meshes with a spur gear 38 that is keyed to a shaft 40. This shaft has a bevel pinion 41 keyed to it which meshes with a bevel gear 42 (Fig. 12). The bevel gear 42 is secured to the underside of the face plate 25 coaxial with work spindle 24.

The shaft 30 is adapted to drive the shaft 36 either through the spur gears 31 and 33 or through the spur gears 32 and 34. The sleeve 35 is shiftable axially of the shaft 36 so as to engage gear 33 with gear 31 or gear 34 with gear 32. Shifting of the sleeve 35 is effected by a lever 55 (Figs. 11 and 12) which is pinned to a shaft 56 that is journaled in a bracket 57 which is secured to the base of the machine. The shaft 56 is connected by a suitable linkage 58 with a shifter member 59 that engages the gear 34. The shift lever 55 is of conventional construction and may contain a spring-pressed plunger that is selectively engageable with notches 53 of a plate 54 to lock the shift lever in any adjusted position. Plate 54 is secured to the base 20 of the machine.

The bevel gear 42 has a plurality of equiangularly spaced blocks 46 bolted or otherwise secured to its upper face, only one of which is shown in Fig. 11. Each block has an arcuate key on its under face which engages in a circular groove in the back face of gear 42. The blocks 46 and the bevel gear 42 are held in position on the face plate by a circular gib 50 which is fastened to the face plate by screws 51.

Each block 46 is formed with an arcuate projection 47 on its upper face which is eccentric of the common axis of the spindle 24 and bevel gear 42. Each projection 47 engages in a complementary arcuate groove formed on the under face of a jaw slide 48. The slides 48 carry the jaws for clamping the work. They slide in T-shaped ways 49 formed radially of the face plate 25. The bevel gear 42, and with it the blocks 46, is free to rotate within the face plate 25 within limits determined by two stop lugs 44 which are secured to the face plate in position to engage opposite ends of a projection 47. The rotation of bevel gear 42 relative to the face plate permits the chuck jaws to be moved to or from chucking position, as known and as will be described further hereinafter.

Bolted to the portion 61 of base 20 is a column or upright 60 (Figs. 1 and 2). This column or upright is secured to the base by bolts that thread into holes 63 in the base. Reciprocably mounted upon this column is the ram 62 which is adapted to carry the boring bar 64. This ram may be reciprocated and controlled in conventional fashion. In fact, all of the preceding structure is conventional with known car wheel borers.

One of the new features of the machine of the present invention is the mounting for the facing tools. Heretofore, the facing tool has been secured to a fluid-pressure actuated ram reciprocable centrally within the column of the machine radially of the work spindle axis and disposed vertically above the drive shaft 40 of the work spindle. In the machine of the present invention there is secured to one side of the base 20 by bolts 70 (Figs. 5 and 11) the bracket 57 referred to already. This bracket is formed with vertically disposed ways 71 and 72 (Fig. 5). Mounted to slide vertically on these ways is a saddle 74. The way 71 is generally dove-tailed in cross section and the saddle 74 is complementarily shaped along one side edge to engage this way. A gib 75 is provided at the other side to engage the way 72 and secure the saddle on the guide ways. Gib 75 is secured to saddle 74 by screws 76.

Reciprocably mounted in the saddle to slide horizontally therein is a ram 77. The ram 77 is held on the saddle 74 by gibs 78 and 79 (Figs. 1, 2, 5, and 7) which are secured to the saddle by screws 83.

The ram 77 carries at its forward end an indexible tool holder 80 (Figs. 1, 9 and 10). This tool holder is square in shape; and it has a peripheral groove 81 in it which has a square-shaped bottom 86 whose sides are parallel to the peripheral sides of the holder. Between the sides of the groove 81 are adapted to be secured the facing, and turning tools C used in the machine. Such tools are conventionally made with shanks that are square or rectangular in cross section; and a tool is secured in the tool holder with its shank between the sides of the groove 81 and with one side of its shank seating against one side of the bottom 86 of the groove and with its cutting portion projecting beyond the edge of the holder as clearly shown in Fig. 9. Bolts 82 serve to fasten the tools in the groove 81.

The tool holder is rotatably mounted upon a sleeve 84 which is secured to the ram 77 by screws 85. The tool holder has face coupling teeth 87 on its inner face which engages with corresponding face coupling teeth formed on a plate 89 which is secured to the ram 77 by screws 90. A coil spring 92 surrounds a post 93 that is threaded into the sleeve 84. This spring is interposed between the front of sleeve 84 and the tool holder 80, and tends to disengage the clutch teeth. The clutch teeth are forced into engagement by a lever 95 and locked in engagement by threading post 93 into sleeve 84. The lever 95 is pivoted at 94 on the post 93 and has furcations 97 that are formed with cam surfaces 96. The cam surfaces 96 are adapted to engage the face of a block 98 which is mounted on the thrust bearing 99 between the front face of the tool holder 80 and the cam surfaces 96. By rotating post 93 through lever 95 and then swinging the lever 95 outwardly, the coupling is released. By releasing the face coupling and rotating the tool holder, one tool C can be moved out of operative position, and another tool C can be brought into operative position. Thus, a facing, turning, or other tool can be positioned to operate on a work-piece. A spring-pressed plunger 100 actuated by spring 101, which is mounted within the head 80 and which is adapted to engage in any one of a plurality of holes 103 in plate 89, serves to determine the indexed position of the tool holder.

The ram 77 is adapted to be moved up or down and in and out to position and actuate the tools. These movements are power-actuated by a conventional hydraulic motor 110 (Fig. 3) which is keyed to a sleeve 111 that is journaled on anti-friction bearings 112 in a control box 114. This box is secured to the top of the bracket 57 in any suitable manner. Integral with the sleeve 111 is a pinion 113 which meshes with and drives a spur gear 115. This spur gear is rotatably mounted on a shaft 117 and is integral with a spur pinion 116 which meshes with and drives a spur gear 118 that is keyed to a shaft 119. The shaft 119 has a spur pinion 120 integral with it which meshes with a spur gear 121. This spur gear 121 is journaled on the shaft 117 and is mounted on anti-friction bearings 122 in the control box 114.

The shaft 117 can be driven through the spur pinion 113 and spur gear 115, or through the pinion 113, gear 115, pinion 116, gear 118, pinion 120, and gear 121, depending upon the position of a shiftable clutch member 125. The clutch member may be a conventional friction clutch or any other suitable type of coupling. The clutch member shown is formed at opposite ends with face coupling teeth 126 and 127 which are adapted to engage, respectively, mating face coupling teeth formed on the gear 115 and gear 121, respectively. The clutch member 125 is adapted to be shifted by a lever 130 (Fig. 1) which is connected in conventional fashion to a yoke member that is adapted to engage in the peripheral groove 131 (Fig 3) of the clutch member 125.

The shaft 117 has a bevel pinion 135 keyed to it at its inner end which meshes with a bevel gear 136. This bevel gear is keyed to a shaft 138 (Fig. 4) on which is slidably mounted a spur pinion 140. The spur pinion is adapted to be shifted axially on the shaft 138 to be engaged selectively either with a spur gear 141 or a spur gear 142. The gear 141 is keyed to a shaft 143 which is parallel to the shaft 138 and at one side thereof. The gear 142 is keyed to a shaft 144 which is parallel to the shaft 138 and at the opposite side thereof. The pinion 140 is adapted to be shifted by a lever 145 (Fig. 1) which is secured to one end of a shaft that is journaled in the bracket 114 and that has a lever 147 (Fig. 3) secured to its opposite end. The last-named lever carries at its free end a shoe 149 that engages the pinion 140.

The shaft 144 has sliding splined engagement with the sleeve 155 (Fig. 7), which is journaled in a bearing member 156 that is secured to the side head 74. This sleeve has bevel pinions 157 and 158 integral with it at opposite ends. Bevel pinion 157 meshes with a miter gear 159 which is keyed to a shaft 160 that has a bevel pinion 162 integral with it. This pinion meshes with a bevel gear 164 which has splined engagement with a horizontal screw shaft 166. The screw shaft 166 is journaled at one end in the ram 77. It threads into a nut 165. This nut has a projection which engages in recess 175 (Fig. 6) of saddle 74 and is therefore held against movement relative to the saddle 74. Hence, as the screwshaft 166 rotates, the ram 77 moves in or out depending on the direction of rotation of the shaft.

The shaft 143 is similarly threaded to thread into a nut 171 (Fig. 6). The nut has a tongue 174 in it which engages in a slot 175 in the side head 74 so that as the screw shaft 143 is rotated in one direction or the other the side head 74 is correspondingly moved up or down. By shifting the pinion 140 (Figs. 3 and 4) axially, then, one or the other of the shafts 143 and 144 can be rotated and the ram can be moved in or out and up or down depending on the direction of rotation of motor 110. The speed of movement will depend in part on the position of clutch 125 (Fig. 3), and in part on the speed of rotation of motor 110, as will be described more particularly hereinafter.

The side head or saddle 74 is constantly urged upwardly by pneumatic pressure on a piston 265 (Fig. 12) which is secured to a rod 266 that is pinned to the side head or saddle 74 (Fig. 1) by a pin 267 and that moves in a cylinder 268 (Fig. 12). This piston 265 and cylinder 268 provide in effect a pneumatic counterweight for the saddle. A breather tube 269 admits air to or exhausts air from the upper side of piston 265. Compressed air is supplied against the under side of this piston through line 270 which may be coupled to any suitable source of compressed air.

Both the screw shaft 166 and the screw shaft 143 are manually rotatable as well as power operated. For the manual rotation of these shafts levers 180 and 181 (Figs. 7 and 6) are provided. Lever 180 is pinned to a pivotal head 182 (Fig. 8) which is pivotal about a pin 183 that is mounted in a sleeve member 184. The head 182 has a groove 185 in it which is adapted to engage a tooth 186 formed in the head 187 of a pin 188. This pin is slidably mounted in the sleeve 184 and is normally spring-pressed outwardly by a spring 189. The opposite end of pin 188 is adapted to be engaged with one of the grooves of a toothed face coupling member 190 that is keyed to a shaft 191. The spring 189 surrounds pin 188 and is mounted in a pocket in sleeve member 184 and is interposed between the bottom of this pocket and the head 187 of pin 188. The sleeve 184 is mounted on the outer end of shaft 191 and is held against axial movement relative to this shaft by a pin 193 which engages in groove 192.

The shaft 191 is journaled in the side head 74 and has a bevel pinion 193 (Fig. 7) integral with it which meshes with the bevel gear 158. The lever 180 is normally held in the position shown in Figs. 7 and 8 by the coil spring 189. When the lever 180 is swung manually upwardly the pin 188 is pressed inwardly against the resistance of the spring 189 to engage in a tooth slot of the face coupling member 190. If the lever is so engaged, and rotated in this engaged position, then, the shaft 191 is rotated to rotate the screw shaft 166 through the gearing 193, 158, 157, 159, 162, and 164, thereby adjusting the ram 77 in or out depending on the direction of rotation of shaft 191.

Similarly the lever 181 may be coupled to a shaft 195 (Fig. 6) which carries a bevel pinion 196 that meshes with a bevel gear 197 which has a splined connection with screw shaft 143 and which rotates in the nut 171. A clip 172 that is secured to nut 174 and that engages in a circular groove 173 in the hub of gear 197 holds the gear 197 against axial movement relative to nut 174 while permitting axial movement of the screw shaft 143 in the gear as the screw shaft threads through the nut. Through engagement and rotation of lever 181, then, side head 74 can be adjusted manually vertically up or down depending on the direction of rotation of lever 181.

A gib 200 is provided to take up wear between the ram 77 and the gib 78. This gib is adjusted by a stud 202 which threads into the side head 74 and engages an extension 203 of the gib 200. A removable spacer sleeve 105, which surrounds the stud and is inserted between extension 203 and side head 74 limits the adjustment of the gib in conventional fashion. Lock-nuts 204 are provided to secure the gib 200 in any adjusted position.

Car wheels may be chucked on this machine with the flange side up or the flange side down. For this purpose a plurality of special work-gripping jaws are provided. These jaws are shown in Figs. 13 to 18 inclusive. Each jaw comprises a block 210 which is adapted to be bolted to one of the slides 48 (Figs. 12 and 14), by T-bolts 212 whose heads engage in a radial T-slot 214 formed in the slide.

Secured in each block 210 by a screw 215 is a post 216. On this post is rotatably mounted a gripping block 218 which is formed on one side face with a serrated gripping surface 219 that, when it is in working position, is adapted to engage the tread portion T of the car wheel W. The block 218 is swung about the axis of post 216 to or from operative position. Block 218 is held either in working or in inoperative position by a spring-pressed plunger 220. This plunger is adapted to engage in one or other of two notches 221 (Fig. 17) formed in the post 216. This plunger is pressed inwardly by a coil spring 222 whose compression can be adjusted by the screw 224 which threads into the block 218.

Mounted beneath each of the blocks 218 is a second gripping block 225. Each block 225 has a circular teat 226 (Fig. 14) integral with it that seats in a circular recess formed in the square shank portion 211 of the block 210. The jaw member 225 is secured to this shank portion by screws 230 (Fig. 15). It has a portion 231 projecting upwardly from it which is adapted to engage behind the back of the portion 232 (Fig. 15) of the block 218 to hold that block against the cutting thrusts. The jaw member 225 has serrations or teeth 235 thereon for gripping the flange F of the car wheel, as shown in Fig. 16.

A screw 233, which threads into the shank portion 211 of the block 210 and which is engageable against the back of the portion 232 of the block 218 at the opposite side of the post 216 from portion 231, is provided to help hold the jaw member 218 rigidly in position when grinding the serrations in gripping surface 219. This screw threads into a hole 234 in the shank portion 211 of block 210. During operation of the machine the screw 233 is retracted, as shown in Fig. 15, so that it will not interfere with movement of gripping block 218 to inoperative position.

The gripping surface 219 of each chucking member is spaced further radially from the axis of post 216 than is the gripping surface 235 of that member. Hence, when gripping block 218 is in operative position, it alone will grip the work W. When it is desired that gripping blocks 225 engage the work, the blocks 218 must be swung to inoperative position. The gripping blocks 218 are employed for chucking when the car wheel is chucked with the flange side up, as shown in Figs. 13, 14 and 19. The gripping members 218 are then positioned to engage the tread T of the wheel W around the periphery of the wheel. When the car wheel is to be chucked flange side down, the gripping blocks 225 are used. The gripping members 218 are then swung out of the way, as shown in Figs. 16, 17, 18 and 20; and the gripping members 225 are engaged with the flange of the wheel.

The outside surfaces of the ways 71 and 72 (Fig. 5) lie in a plane offset but parallel to the axis X (Fig. 2) of the face plate 25; and this plane is so offset from the plane of the axis X that a tool carried by ram 77 will on movement of the ram move radially of axis X. Hence, the tool will face or turn the work properly. With the tool ram mounted at the side of the column of the machine, moreover, a turning tool can be moved up or down freely and a wheel can be turned that could not be handled on a conventional borer. The range of movement of the turning tools permits chucking the work either flange side up or flange side down so that both sides of a wheel hub can be faced and turned on the present machine.

When the flange side of the wheel is chucked up, as already stated and as shown in Fig. 19, the gripping blocks 218 are engaged with the wheel tread T. The gripping jaws are adjusted to the correct chucking position in accordance with the diameter of the work W by adjustment of the stands 210 (Fig. 13) radially on the slides 48 (Figs. 12 and 14). The rotation of the work spindle moves the gripping jaws into gripping engagement with the work, because when the motor 27 (Fig. 1) is first started, the gear 42 revolves in the face plate 25 and the cam projections 47 (Figs. 11 and 12) of blocks 46 move the slides 48 radially inwardly. The gripping jaws are thereby caused to clamp the work. After the work has been clamped, it revolves with the face plate 25.

With the flange side of the wheel chucked up, the bore B of the wheel can be rough and finish bored, and chamfered successively in conventional manner by feeding the boring bar 64 axially downwardly through the bore B of the work (Fig. 19) to cause the rough-boring tool 240, the finish-boring tool 241 and the chamfering tool 242 to perform their operations successively on the rotating workpiece. The speed of rotation of the workpiece can be selected by shifting sleeve 35 (Fig. 11) to cause motor 27 (Fig. 1) to drive pinion 41 and gear 42 (Figs. 11 and 12) either through gears 31, 33, 37 and 38 or gears 32, 34, 37 and 38.

On completion of the chamfering operation the boring bar 64 is raised out of engagement with the work by upward movement of ram 62 as in conventional boring machines.

With the work still chucked flange side up, the side 251 of its hub H can be faced by bolting a suitable facing tool 250 (Fig. 19) in the tool holder 80 (Figs. 9 and 10), indexing the tool holder into position for this tool to operate, and moving this tool radially across the surface 251 as the work W continues to rotate with the face plate 25. The radial movement of the facing tool 250 is effected by engaging pinion 140 (Fig. 4) with gear 142 and starting motor 110. The motor 110 then drives shaft 144 through gearing 113, 115, 135, 136, 140 and 142 (Figs. 3 and 4) or through gearing 113, 115, 116, 118, 120, 121, 135, 136, 140 and 142 depending on the position of clutch sleeve 125; and shaft 144 drives screw 166 (Fig. 7), through gearing 157, 159, 162, 164. The ram 77 is thus moved horizontally on saddle 74 to move the facing tool 250 (Fig. 19) radially across the surface 251 of the rotating workpiece W.

With the work chucked flange side up, the outside surface 253 of its hub can also be turned. For this purpose a turning tool 252 may be bolted in tool holder 80, and tool holder 80 is manually indexed to bring this tool into operative position by turning stud 93 through lever 95 and then swinging lever 95 (Fig. 10) upwardly to rock cam surfaces 96 off the outer surface of block 98 and bring flattened surfaces 104 of the lever into engagement with this block. This releases the pressure on holder 80 and allows the coupling teeth 87 to be readily disengaged and the holder to be rotated readily on stud 84. After the turning tool is in operative position, the lever 95 is swung down again to the position shown in Fig. 10 and the stud 93 is threaded home again in sleeve 92 to lock the tool holder 80 in place. The turning tool can be moved to the correct position radially of the workpiece under power through powered movement of ram 77, or the motor 110 (Figs. 3 and 4) can be shut off and the ram 77 can be shifted manually by manipulation of lever 180 (Figs. 7 and 8), to engage coupling pin 188 with face coupling member 190, and rotating shaft 191 to rotate screw shaft 166 and drive ram 77 through gearing 193, 158, 157, 159, 162, 164, screw shaft 166, and nut 165. The turning tool 252 may be moved by power to the correct position axially of the work by shifting gear 140 (Fig. 4) into engagement with gear 141 so that the saddle 74 is power-operated from motor 110 (Fig. 3); or it may be moved manually to the correct axial position by manipulating lever 181 (Fig. 6) to rotate shaft 195, pinion 196, and gear 197, and cause screw shaft 143 to revolve in nut 171 and raise or lower the saddle. After the turning tool 252 (Fig. 19) has been correctly positioned radially and axially, turning of the peripheral surface 251 of the hub H of the work may be effected by rotating the work W while feeding the tool 252 axially or radially of the work through power operation of screw shaft 143 or screw shaft 166.

With the work chucked flange side up, the tread rim R can also be faced if necessary. For this purpose facing tool 250 may be used, this tool being again positioned by indexing work holder 80 and by shifting saddle 74 and ram 77 manually or by power. For the facing operation itself the tool is, as before, moved radially of the work by power operation of ram 77 while the work is rotating through rotation of face plate 25.

With the work chucked flange side up, the outside diameter of the flange F can also be turned, if necessary, to obtain a surface concentric for chucking. For this purpose, a tool 254 (Fig. 19) may be used. This tool is bolted in tool holder 80; and again the tool holder is indexed manually to bring this tool into operating position. Again, also, ram 77 and saddle 74 are moved manually or under power to position the tool in the correct radial and axial position. Then the periphery of flange F is turned by rotating the work past the tool 254 while moving the tool radially through power operation of ram 77.

When the desired operations on the one side of the wheel have been performed, the motor 27 (Fig. 1) is stopped and reversed to disengage chucking blocks 218 (Fig. 19) from the work. To aid in unchucking, the work spindle 24 may be braked by applying a brake to the face plate 25. A brake-band 285 (Fig. 11) actuated by leverage 286 and an air cylinder 287 may be used for this purpose as is conventional.

Figure 20:
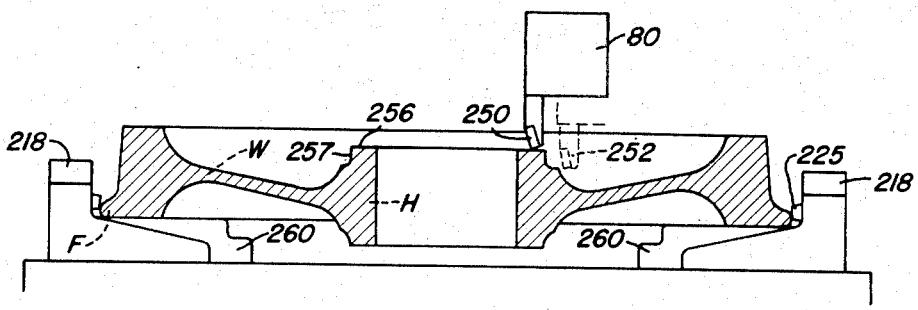
Fig. 20 is a diagrammatic view illustrating operations which may be performed when the car wheel is chucked flange side down.

Then the chucking jaws 218 are swung out of the way, and the car wheel lifted and reversed as shown in Fig. 20. With its flange side down, the wheel is chucked and centered on the outside diameter of its flange F by the five jaw blocks 225, these blocks being engaged with the work again through action of cam projections 47 (Figs. 11 and 12).

The side 256 (Fig. 20) of the hub H can now be faced by facing tool 250, the tool holder 80 being first indexed to bring this tool into cutting position, and this tool being then moved to the correct position axially and radially of the work by power or manual movement of saddle 74 and ram 77. Facing of the surface 256 is effected by moving tool 250 radially across surface 256 by power movement of ram 77 as the work rotates.

With the work chucked flange side down, the outside surface 257 of the hub can also be turned by tool 252, this tool being indexed into position by indexing tool holder 80, and this tool being positioned axially and radially as before by power or manual operation of saddle 74 and ram 77. During turning the tool 252 is fed radially or axially by power operation of ram 77 or saddle 74 while the work rotates.

When the desired operations on this other side of the wheel have been completed, the work is dechucked, as before, by stopping and reversing work spindle drive motor 27 and throwing on fluid-pressure operated brake 285.

In either chucking position the wheel is supported by rests 260 which are secured to the face plate between the chucking jaws by bolts 261 (Figs. 13 and 14).

The hydraulic motor 110 may, as stated, be of conventional construction. Its direction, and, in part, its speed, may be controlled in conventional manner by lever 130. This lever is mounted for rocking movement in two directions at right angles to one another about studs 277 and 278 (Fig. 4) to effect the desired controls. When the lever is swung about stud 277, the valve 280, which controls the direction of flow of the motive fluid, is shifted. This not only determines the direction of rotation of motor 110 but through operation of a conventional metering valve, denoted generally at 282, determines the rate of rotation of the motor, the motor being operated at high speed for traverse and at low speed for feed. By swinging lever 130 about stud 278 coupling member 125 (Fig. 3) is shifted to provide additional range for variation in rates of feed and traverse. Through providing a lever 130, which controls both the valve 280, which selects direction, and feed, or traverse, and the coupling member 125, which provides additional control over the rates of feed and traverse, we have provided a simple, compact control over the rates and direction of operation of the turning and facing tools.

Control levers 145, 130, 181, 180 are all handy to the operator as shown in Fig. 1. The machine can, therefore, be very easily manipulated and controlled.

While the invention has been described in connection with the production of a car wheel which is to be faced and turned on both sides, it will be understood that it can readily be used for facing, turning, and boring a wheel which is to be faced and turned on one side only. It has for such work a greater capacity particularly as far as turning is concerned, than a conventional boring machine of the same floor area.

While the invention has been described, moreover, in connection with a particular embodiment thereof, it will be understood that it is capable of further modification, and this application is intended to cover any adaptations, uses, or variations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described our invention, what we claim is:

1. In a car wheel boring machine, a rotary face plate, a plurality of chucking members mounted on said face plate in angularly-spaced relation and adapted to grip a car wheel about its tread, and a plurality of separate chucking members mounted on said face plate in angularly spaced relation and adapted to grip a car wheel about the periphery of its flange, one set of chucking members being movable out of operative position to permit operation of the other set.

2. In a car wheel boring machine, a rotary face plate, and a plurality of chucking members mounted on said face plate in angularly-spaced relation, each chucking member comprising a gripping block rigidly secured to the chucking member and a second gripping block movably mounted on said chucking member independently of the first-named gripping block, one of said gripping blocks being adapted to engage the tread of a car wheel and the other of said gripping blocks being adapted to engage the periphery of the flange of the wheel, said movable blocks being movable into and out of operative position, and said movable blocks, when in operative position, projecting inwardly radially of the axis of the face plate further than said fixed blocks.

3. In a car wheel boring machine, a rotary face plate, and a plurality of chucking members mounted on said face plate in angularly-spaced relation, each chucking member comprising a gripping block rigidly secured to the chucking member and a second gripping block rotatably mounted on said chucking member for movement thereon independently of the first-named gripping block, one of said gripping blocks being adapted to engage the tread of a car wheel and the other of said gripping blocks being adapted to engage the periphery of the flange of the wheel, said rotatable blocks being rotatable into and out of operative position, and said rotatable blocks, when in operative position, projecting inwardly radially of the axis of the face plate further than said fixed blocks.

4. In a car wheel boring machine, a rotary face plate, and a plurality of chucking jaws mounted on said face-plate and movable thereon radially of the axis of the face plate, each of said chucking jaws comprising a base, a stud secured to said base, a gripping block secured at one side of said base and at one side of said stud, and a gripping block rotatably mounted on said stud, said second-named gripping block being rotatable on said stud to move it to and from operative to inoperative position and having a gripping surface at a greater radius from the axis of said stud than the gripping surface of said first-named gripping block.

5. In a car wheel boring machine, a rotary face plate, and a plurality of chucking jaws mounted on said face-plate and movable thereon radially of the axis of the face plate, each of said chucking jaws comprising a base, a stud secured to said base, a gripping block secured at one side of said base and at one side of said stud, and a gripping block rotatably mounted on said stud, said second-named gripping block being rotatable on said stud to move it to and from operative to inoperative position and having a gripping surface at a greater radius from the axis of said stud than the gripping surface of said first-named gripping block, means for holding said rotatable gripping block in either of its positions, and means on said base abutting against said second-named gripping block when it is in operative position to take the cutting thrusts.

6. In a car wheel boring machine, a rotary face plate, and a plurality of chucking jaws mounted on said face plate and movable thereon radially of the axis of the face plate, each of said chucking jaws comprising a base, a stud secured to the base, a gripping block secured at one side of said base and at one side of said stud, and a gripping block rotatably mounted on said stud above the first-named gripping block, said second-named gripping block being rotatable on said stud to move it to and from operative position, and having a gripping surface at a greater radius from the axis of said stud than the gripping surface of said first-named gripping block.

7. In a car wheel boring machine, a rotary face-plate, and a plurality of chucking jaws mounted on said face-plate and movable thereon radially of the axis of the face plate, a plurality of work rests secured to said face plate and alternating with said chucking jaws about the axis of the face plate and against which a side surface of the car wheel may be seated, each of said chucking jaws comprising a base, a stud secured to said base, a gripping block secured at one side of said base and at one side of said stud, and a gripping block rotatably mounted on said stud and displaced axially of said stud from the first-named gripping block, said second-named gripping block being rotated on said stud to move it to and from operative position, and means for securing each of the second-named gripping blocks in operative position, each second-named gripping block, when in operative position, projecting radially of the axis of the stud beyond the associated first-named gripping block.

8. In a car wheel boring machine, a rotary face-plate, a plurality of slides reciprocably mounted on the face plate for movement toward and from the axis of the face plate, a chucking jaw mounted on each slide and adjustable thereon radially of said axis, each chucking jaw comprising a base, a gripping block secured at one side to said base, a gripping block movably mounted on said base, said second-named gripping block being movable on said base independently of the first-named gripping block to and from operative position, and means for securing each of the second-named gripping blocks in operative position, each second-named gripping block, when in operative position, projecting radially of the face plate beyond the associated first-named gripping block, and means for moving all said slides simultaneously toward or from the axis of the face plate.

ALFRED TROSCH.
ROLAND R. ROBERTS.

References Cited in the file of this patent

UNITED STATES PATENTS

| Number | Name | Date |
|---|---|---|
| 23,472 | Johnson | Apr. 5, 1859 |
| 1,089,362 | Hannifin | Mar. 3, 1914 |
| 1,681,166 | Beck | Aug. 21, 1928 |
| 1,730,063 | Dunstan | Oct. 1, 1929 |
| 2,393,696 | Kraut et al. | Jan. 29, 1946 |
| 2,394,861 | Tourneau | Feb. 12, 1946 |